No. 889,337. PATENTED JUNE 2, 1908.
E. RILEY.
CHURN OPERATING MECHANISM.
APPLICATION FILED JULY 23, 1907.
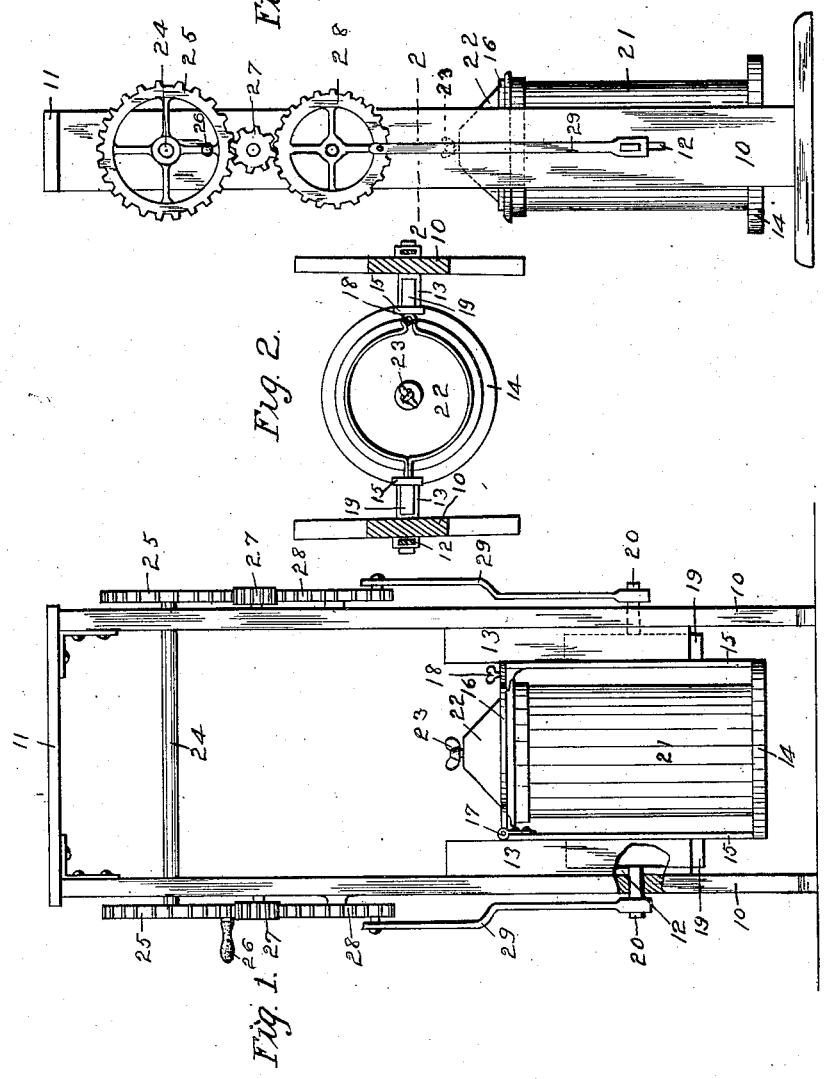
Witnesses.
R. C. Dahlberg.
N. O. Bennett.
Inventor.
Edward Riley.
by Onug K Lane Atty's.

UNITED STATES PATENT OFFICE.

EDWARD RILEY, OF AGENCY, MISSOURI.

CHURN-OPERATING MECHANISM.

No. 889,337.  Specification of Letters Patent.  Patented June 2, 1908.

Application filed July 23, 1907. Serial No. 385,174.

*To all whom it may concern:*

Be it known that I, EDWARD RILEY, a citizen of the United States, residing at Agency, in the county of Buchanan and State of Missouri, have invented a certain new and useful Churn-Operating Mechanism, of which the following is a specification.

The object of my invention is to provide a churn operating mechanism of simple, durable and inexpensive construction designed to receive a churn body of any ordinary size or shape, such for instance as the ordinary cream cans now in general use, which can may be readily and quickly connected therewith, or detached therefrom.

A further object is to provide a device of this kind in which the operating handle is located in a position convenient for the operator, to the churn body, in one position of its movement close to the ground, so that it may be easily moved from the ground to position within the churn operating device, or vice-versa.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a side elevation of a complete churn operating device embodying my invention, with the churn body in position therein. Fig. 2 shows a horizontal sectional view of same, on the line 2—2 of Fig. 3, and Fig. 3 shows an edge elevation of same.

Referring to the accompanying drawings, the frame of the device is composed of two uprights 10, and the top cross piece 11, firmly connected together. In the sides of the uprights 10 near their lower ends, are longitudinal slots 12, and fixed to the inner face of each upright, adjacent to the slot is a channel bar 13, with its open side toward the center of the frame. These channel bars are also slotted. The device for supporting and engaging the churn body comprises a disk shaped base 14, and two uprights 15, attached to opposite sides thereof. On top of one of the members 15 is a collar 16 hinged at 17 to the said frame member. This collar is detachably connected with the opposite frame member, by means of a set screw 18 so that said collar may be easily swung from the position shown in Fig. 1, upwardly to permit the removal of the churn body. On each of the uprights 15 is a guide block 19 resting in the adjacent channel bar 13, and on each of said blocks is a journal 20, projected outwardly through the slot 12. The churn body which is shown in the drawings, is of the same size and shape as the ordinary cream can now in general use, and comprises a cylindrical body 21 with a detachable cover 22. In the top of the cover is a screw plug 23, which may be removed if it is desired to permit ventilation of the churn body.

Mounted near the tops of the uprights 10 is a shaft 24 having on each end a gear wheel 25. Connected with one of these gear wheels is an operating handle 26. Below each of the wheels 25 is an idler pinion 27 in mesh with the gear wheel 25, and below each of the pinions 27 is a large gear wheel 28 in mesh with said pinion. Each of the gear wheels 28 is connected with the pitman 29, which has its lower end attached to the journal 20.

In practical use, and assuming the parts to be assembled as shown in Fig. 1, the operator may turn the handle 26 and thus impart a reciprocating motion to the churn body. By having the gear wheels and pinions arranged as shown, the operating handle may be placed in position which would be convenient for the operator, and the pitman 29 will not interfere with the operating handle, and by having the circular base 14 arranged near the bottom of the frame, an operator may quickly and easily place a can of milk on said base, to be churned. After the churning is completed, the operator releases the screw 18 and then elevates the collar 16, whereupon the can 21 may be quickly and easily removed and if desired, the butter may be left in said can, and a new can placed in position for churning. In view of the fact that these cans are now in very general use, the operating device only need be placed upon the market, and the purchaser need not go to the expense of buying an extra churn body, in connection with the operating device, as the ordinary cream cans may be used for this purpose.

Having thus described my invention, what I claim and desire to secure by Letters Patent of the United States, therefor, is,

An improved churn operating device comprising a frame, a shaft mounted near the top of the frame, gear wheels on the ends of said shaft, an operating handle on one of said gear wheels, idler pinions mounted on the frame below said gear wheels, and in mesh therewith, gear wheels mounted on the frame below said idlers and in mesh therewith, a pitman connected with each of the latter gear wheels and extended downwardly, two channel bars fixed to the inner faces of the main frame members, guide blocks slidingly mounted in said channel bars, journals fixed to the guide blocks and extended outwardly through the channel bars and having said pitman attached thereto, a churn body supporting frame comprising side pieces fixed to the said guide blocks and extended below them, a base fixed to the lower ends of said side pieces, a collar hinged to the top of one of said side pieces, a set screw in the opposite end of the collar to connect it with the other side piece, and a churn body designed to be mounted on the base, and provided with a cover designed to enter said collar.

Des Moines, Iowa, June 29, 1907.

EDWARD RILEY.

Witnesses:
A. A. BOSTICK,
JOHN JENNINGS.